United States Patent
Ko et al.

(10) Patent No.: US 12,202,072 B2
(45) Date of Patent: Jan. 21, 2025

(54) SECONDARY BATTERY

(71) Applicant: Samsung SDI Co., Ltd., Yongin-si (KR)

(72) Inventors: Sung Gwi Ko, Yongin-si (KR); Dae Kyu Kim, Yongin-si (KR); Jin Young Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/300,226

(22) Filed: Apr. 13, 2023

(65) Prior Publication Data

US 2023/0249288 A1    Aug. 10, 2023

Related U.S. Application Data

(63) Continuation of application No. 16/769,324, filed as application No. PCT/KR2018/011760 on Oct. 5, 2018.

(30) Foreign Application Priority Data

Dec. 5, 2017   (KR) .......................... 10-2017-0166108

(51) Int. Cl.
*H01M 10/0525*    (2010.01)
*B23K 26/08*      (2014.01)
(Continued)

(52) U.S. Cl.
CPC ............ *B23K 26/323* (2015.10); *B23K 26/08* (2013.01); *B23K 26/21* (2015.10);
(Continued)

(58) Field of Classification Search
CPC .......... B23K 2101/36; B23K 2103/18; B23K 26/08; B23K 26/0876; B23K 26/21;
(Continued)

(56) References Cited

U.S. PATENT DOCUMENTS 7,618,745 B2   11/2009   Yamashita et al.
8,071,230 B2   12/2011   Kim et al.
(Continued)

FOREIGN PATENT DOCUMENTS

CN    101009365 A    8/2007
CN    104025337 A    9/2014
(Continued)

OTHER PUBLICATIONS

Machine translation JP2003187773A (Year: 2003).*
(Continued)

*Primary Examiner* — Victoria H Lynch
(74) *Attorney, Agent, or Firm* — Lewis Roca Rothgerber Christie LLP

(57) ABSTRACT

The present invention relates to a secondary battery capable of improving the coupling force between a safety vent and a cap-up. For example, disclosed is a secondary battery comprising: an electrode assembly; a case for accommodating the electrode assembly; a cap assembly coupled to the upper part of the case; and a gasket interposed between the cap assembly and the case, wherein the cap assembly includes a cap-up and a safety vent, which is provided at the lower part of the cap-up and has a vent extension part extending to the upper part of the cap-up so as to encompass the edge of the cap-up, a welding region, in which the safety vent and the cap-up are welded and coupled by laser welding, is formed in the vent extension part, and the welding region is formed in a line shape.

11 Claims, 6 Drawing Sheets

(51) Int. Cl.
  *B23K 26/21* (2014.01)
  *B23K 26/323* (2014.01)
  *H01M 50/167* (2021.01)
  *H01M 50/169* (2021.01)
  *H01M 50/171* (2021.01)
  *H01M 50/30* (2021.01)
  *H01M 50/574* (2021.01)
  *B23K 101/36* (2006.01)
  *B23K 103/18* (2006.01)
  *H01M 50/593* (2021.01)

(52) U.S. Cl.
  CPC ..... *H01M 10/0525* (2013.01); *H01M 50/167* (2021.01); *H01M 50/169* (2021.01); *H01M 50/171* (2021.01); *H01M 50/30* (2021.01); *H01M 50/574* (2021.01); *B23K 2101/36* (2018.08); *B23K 2103/18* (2018.08); *H01M 50/593* (2021.01)

(58) Field of Classification Search
  CPC ............... B23K 26/244; B23K 26/323; H01M 10/0525; H01M 50/152; H01M 50/159; H01M 50/167; H01M 50/169; H01M 50/171; H01M 50/186; H01M 50/30; H01M 50/3425; H01M 50/574; H01M 50/578; H01M 50/593; Y02E 60/10
  See application file for complete search history.

(56) References Cited

U.S. PATENT DOCUMENTS

| 9,722,218 | B2 | 8/2017 | Ikeda et al. |
| 10,328,513 | B2 | 6/2019 | Lin et al. |
| 2007/0172728 | A1 | 7/2007 | Yamashita et al. |
| 2007/0212595 | A1 | 9/2007 | Kim et al. |
| 2014/0349148 | A1 | 11/2014 | Ikeda et al. |
| 2014/0352835 | A1 | 12/2014 | Lin et al. |
| 2017/0309879 | A1 | 10/2017 | Ko et al. |

FOREIGN PATENT DOCUMENTS

| CN | 104209651 A | 12/2014 |
| EP | 2808119 A2 | 12/2014 |
| JP | 59-154746 A | 9/1984 |
| JP | 2003-187773 A | 7/2003 |
| JP | 2007-213819 A | 8/2007 |
| JP | 2009-266782 A | 11/2009 |
| JP | 4688688 B2 | 5/2011 |
| KR | 10-2007-0077436 A | 7/2007 |
| KR | 10-2007-0093171 A | 9/2007 |
| KR | 10-0878701 B1 | 1/2009 |
| KR | 10-0989840 B1 | 10/2010 |
| KR | 10-1520064 B1 | 5/2015 |
| KR | 10-2017-0058582 A | 5/2017 |

OTHER PUBLICATIONS

Chinese Office Action dated Feb. 22, 2022, issued in Chinese Patent Application No. 201880084751.2 (7 pages).
Korean Office action for Application No. 10-2017-0166108, dated Sep. 14, 2022, 5 pages.
EPO Extended European Search Report dated Jun. 11, 2021, issued in corresponding European Patent Application No. 18886800.4 (8 pages).

* cited by examiner

SECONDARY BATTERY

CROSS-REFERENCE TO RELATED APPLICATION(S)

This application is a continuation of U.S. patent application Ser. No. 16/769,324, filed Jun. 3, 2020, which is a National Phase Patent Application of International Patent Application Number PCT/KR2018/011760, filed on Oct. 5, 2018, which claims priority of Korean Patent Application No. 10-2017-0166108, filed Dec. 5, 2017. The entire contents of all of which are hereby incorporated by reference.

TECHNICAL FIELD

The present invention relates to a secondary battery.

BACKGROUND ART

Lithium ion secondary batteries are being widely used in portable electronic devices and as power sources of hybrid automobiles and electric vehicles because of various characteristics, including a relatively high operation voltage, relatively high energy density per unit weight, and so forth. The lithium ion secondary battery can be generally classified as a cylinder-type secondary battery, a prismatic-type secondary battery, or a pouch-type secondary battery.

Specifically, the cylindrical lithium ion secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

Provided is a secondary battery capable of improving the coupling force between a safety vent and a cap-up.

SOLUTION TO PROBLEM

According to an aspect of the present invention, provided is a secondary battery including: an electrode assembly; a case for accommodating the electrode assembly; a cap assembly coupled to the upper part of the case; and a gasket interposed between the cap assembly and the case, wherein the cap assembly includes a cap-up and a safety vent, which is provided at the lower part of the cap-up and has a vent extension part extending to the upper part of the cap-up so as to encompass the edge of the cap-up, a welding region, in which the safety vent and the cap-up are welded and coupled by laser welding, is formed in the vent extension part, and the welding region is formed in a line shape.

The welding region may be spaced apart from an end of the vent extension part.

A distance between the welding region and the end of the vent extension part may be greater than 1% of a length of the vent extension part.

The welding region may be covered by the gasket.

A length of the welding region may be greater than 5% of the overall circumference of the vent extension part.

The welding region may be formed by moving a laser beam sideways while rotating the laser beam in one direction.

The upper part of the welding region may be concavely formed from a surface of the vent extension part.

The welding region may include two or more welding regions.

The cap-up may include a first metal layer made of iron and a second metal layer formed by plating nickel on a surface of the first metal layer, and the welding region may be formed such that the vent extension part, the first metal layer and the second metal layer are fused together and then cured.

Advantageous Effects of Disclosure

As described above, in the secondary battery according to an embodiment of the present invention, a safety vent and a cap-up are laser-welded in a line shape, thereby improving a coupling force therebetween.

In addition, in the secondary battery according to an embodiment of the present invention, a welding region between a safety vent and a cap-up is formed to be spaced a predetermined distance apart from an end of the safety vent to cover the welding region using a gasket, thereby improving quality by preventing the cap-up from being oxidized.

MODE OF DISCLOSURE

Hereinafter, example embodiments of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising" when used in this specification, specify the presence of stated features, numbers, steps, operations, elements, and/or components, but do not preclude the presence or addition of one or more other features, numbers, steps, operations, elements, components, and/or groups thereof.

Figure 1:
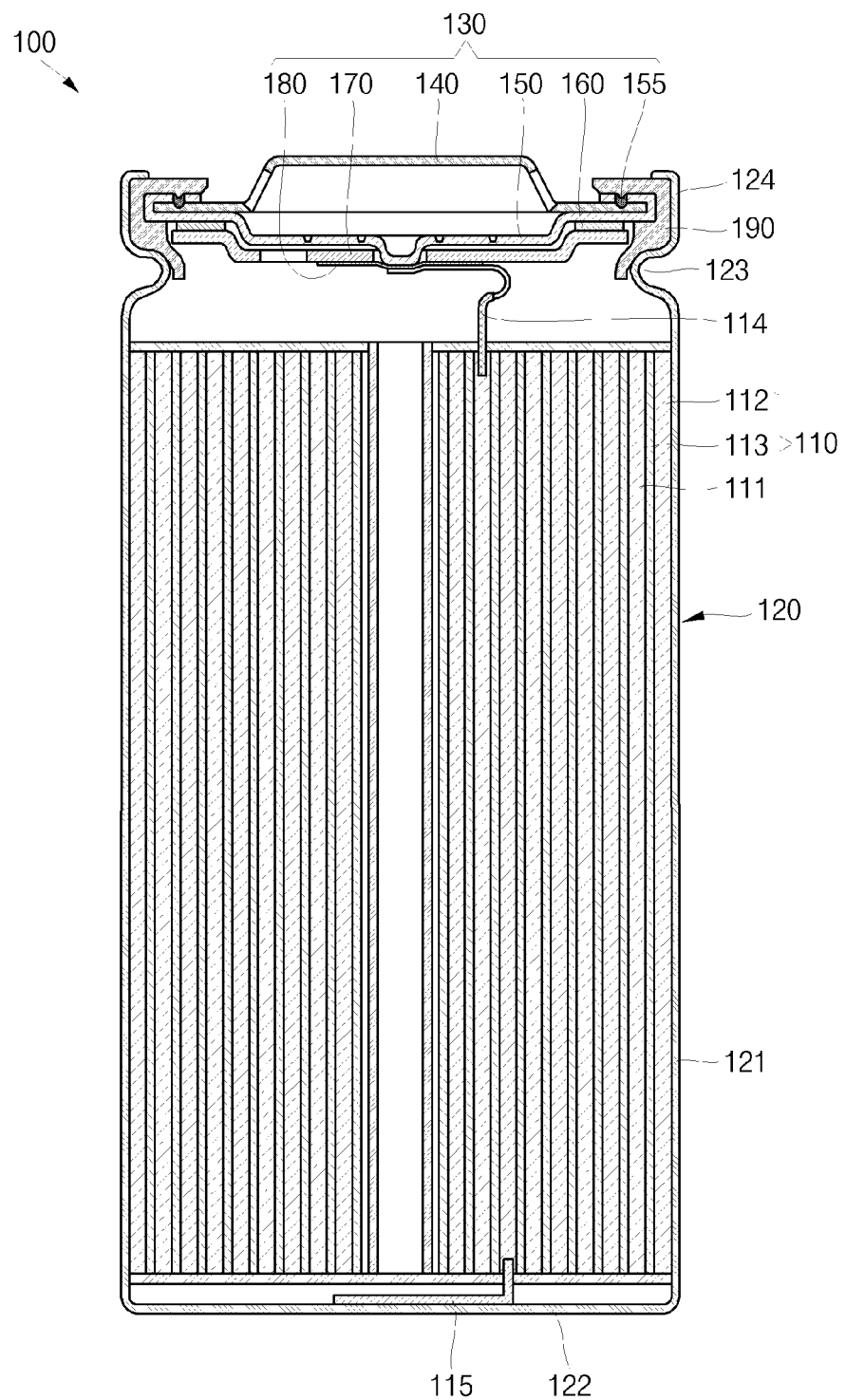
FIG. 1 is a cross-sectional view illustrating a secondary battery according to an embodiment of the present invention.
Figure 2:
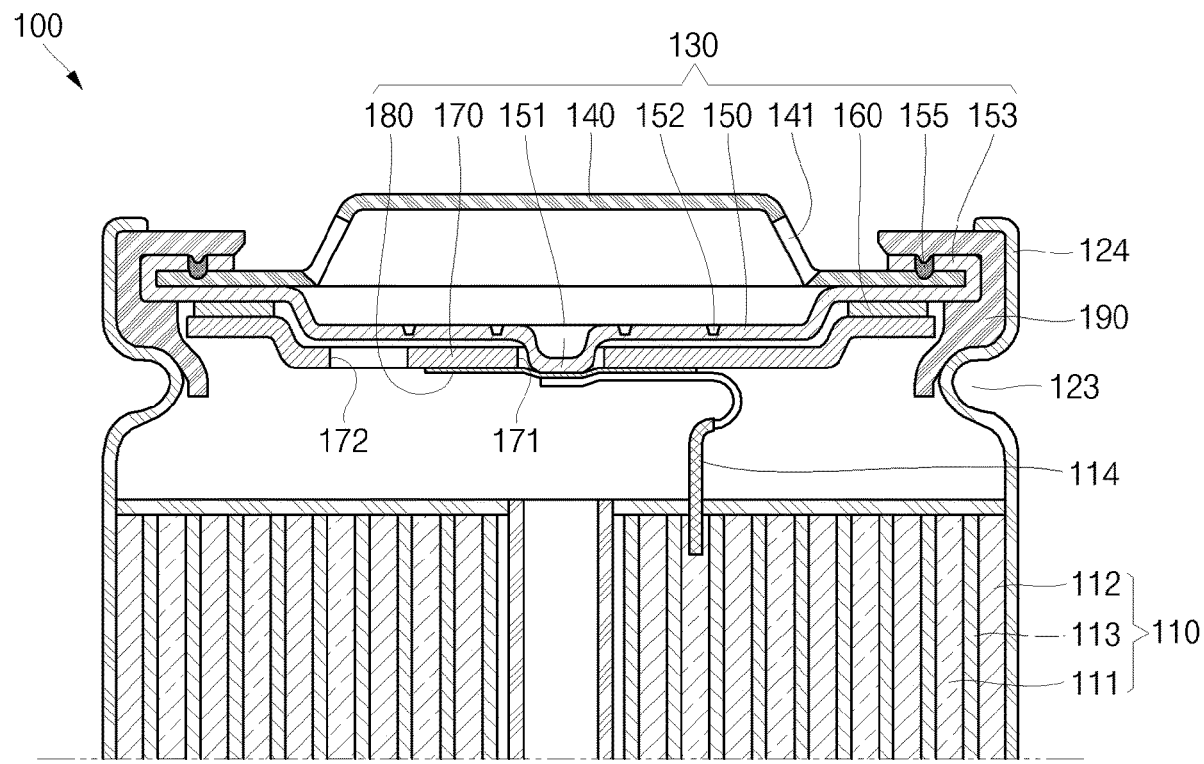
FIG. 2 is a cross-sectional view illustrating a cap assembly in the secondary battery according to an embodiment of the present invention.
Figure 3:
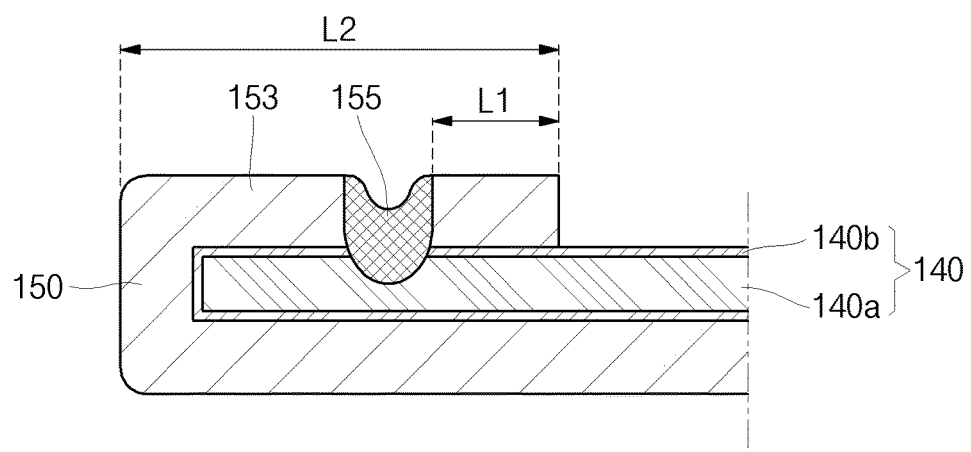
FIG. 3 is a cross-sectional view illustrating a welding region formed between a cap-up and a safety vent in the secondary battery according to an embodiment of the present invention.

FIG. 1 is a cross-sectional view illustrating a secondary battery according to an embodiment of the present invention. FIG. 2 is a cross-sectional view illustrating a cap assembly in the secondary battery according to an embodiment of the present invention. FIG. 3 is a cross-sectional view illustrating a welding region formed between a cap-up and a safety vent in the secondary battery according to an embodiment of the present invention.

Referring to FIGS. 1 to 3, the secondary battery according to an embodiment of the present invention includes an electrode assembly 110, a case 120, a cap assembly 130, and a gasket 190.

The electrode assembly 110 includes a first electrode 111, a second electrode 112, and a separator 113 interposed between the first electrode 111 and the second electrode 112. The electrode assembly 110 may be formed by winding a stacked structure of the first electrode 111, the separator 113 and the second electrode 112 in a jelly-roll configuration. Here, the first electrode 111 may function as a positive electrode, and the second electrode 112 may function as a negative electrode. A first electrode tab 114 is connected to the cap assembly 130 on the electrode assembly 110, and a second electrode tab 115 is connected to a bottom plate 122 of the case 120 under the electrode assembly 110.

The first electrode 111 is formed by coating a first electrode active material such as a transition metal oxide on a first electrode current collector formed of a metal foil made of aluminum. A first electrode uncoated portion without a first electrode active material coated thereon is formed on the first electrode 111, and a first electrode tab 114 is attached to the first electrode uncoated portion. One end of the first electrode tab 114 is electrically connected to the first electrode 111, and the other end of the first electrode tab 114 upwardly protrudes from the electrode assembly 110 and is electrically connected to the cap assembly 130.

The second electrode 112 is formed by coating a second electrode active material such as graphite or carbon on a second electrode current collector formed of a metal foil made of copper or nickel. A second electrode uncoated portion without a second electrode active material coated thereon is formed on the second electrode 112, and a second electrode tab 115 is attached to the second electrode uncoated portion. One end of the second electrode tab 115 is electrically connected to the second electrode 112, and the other end of the second electrode tab 115 downwardly protrudes from the electrode assembly 110 and is electrically connected to the bottom plate 122 of the case 120.

The separator 113 is positioned between the first electrode 111 and the second electrode 112 and prevents a short circuit while allowing lithium ions to move. The separator 113 may include polyethylene, polypropylene, or a composite film of polyethylene, polypropylene.

The case 120 includes a cylindrical side surface plate 121 having a predetermined diameter to form a space for accommodating the electrode assembly 110, and the bottom plate 122 sealing the bottom portion of the side surface plate 121. A top opening of the case 120 is opened to be sealed after the electrode assembly 110 is inserted into the case 120. In addition, a beading part 123 for preventing movement of the electrode assembly 110 is formed at the upper part of the case 120. A crimping part 124 for fixing the cap assembly 130 is formed at the topmost part of the case 120.

The cap assembly 130 includes a cap-up 140, a safety vent 150, an insulator 160, a cap-down 170, and a sub-plate 180.

The cap-up 140 has a top portion that is convexly formed and is configured to be electrically connected to an external circuit. In addition, the cap-up 140 has a gas discharge hole 141 formed to provide for a path through which the internal gas generated in the case 120 can be discharged. The cap-up 140 is electrically connected to the electrode assembly 110 to transmit current generated in the electrode assembly 110 to an external circuit. In addition, as illustrated in FIG. 3, the cap-up 140 includes a first metal layer 140a made of iron (Fe), and a second metal layer 140b formed by plating nickel (Ni) on a surface of the first metal layer 140a.

The safety vent 150 is formed to have a circular panel shaped to correspond to the cap-up 140. A downwardly protruding protrusion part 151 is formed at the center of the safety vent 150. The safety vent 150 is electrically connected to the sub-plate 180 fixed to a bottom surface of the cap-down 170 by the protrusion part 151, which passes through a through-hole 171 of the cap-down 170. In some embodiments, the protrusion part 151 of the safety vent 150 and the sub-plate 180 may be welded to each other by laser welding, ultrasonic welding, resistance welding or an equivalent thereof. In addition, a notch 152 for guiding a rupture of the safety vent 150 is formed on or along the outer peripheral edge of the protrusion part 151.

When an abnormal internal pressure is generated in the case 120, the safety vent 150 is configured to discharge the internal gas while interrupting the flow of current. When an internal pressure of the case 120 exceeds an operating pressure of the safety vent 150, the protrusion part 151 upwardly rises due to the gas discharged through a gas discharge hole 172 in the cap-down 170 and is electrically disconnected from the sub-plate 180. In some embodiments, the welded portion of the protrusion part 151 is broken and the safety vent 150 and the sub-plate 180 are electrically disconnected from each other. If the internal pressure of the case 120 exceeds a rupture pressure that is higher than the operating pressure of the safety vent 150, the notch 152 of the safety vent 150 ruptures, thereby preventing the secondary battery 100 from exploding. The safety vent 150 may be made of aluminum (Al).

An outer peripheral edge of the safety vent 150 is installed to tightly contact portions of the cap-up 140 other than the upwardly protruding portion of the cap-up 140. That is to say, the outer peripheral edge of the safety vent 150 and an outer peripheral edge of the cap-up 140 contact each other. In addition, the outer peripheral edge of the safety vent 150 extends to the upper part of the cap-up while encompassing the edge of the cap-up 140. Here, the part upwardly extending from the cap-up 140 is defined as the vent extension part 153. In addition, the upper part of the vent extension part 153 is welded by laser welding to fix the safety vent 150 to the cap-up 140. Some portions of the safety vent 150 and the cap-up 140 are fused by the laser welding to form welding regions 155. The welding regions 155 will later be described in greater detail.

The insulator 160, which is interposed between the safety vent 150 and the cap-down 170, insulates the safety vent 150 and the cap-down 170 from each other. Specifically, the insulator 160 is interposed between the outer peripheral edge of the safety vent 150 and the outer peripheral edge of the cap-down 170. The insulator 160 may be made of a resin material, such as polyethylene (PE), polypropylene (PP), or polyethylene terephthalate (PET).

The cap-down 170 is formed of a circular panel body. The through-hole 171 is formed at the center of the cap-down 170, and the protrusion part 151 of the safety vent 150 passes through the through-hole 171. In addition, the gas discharge hole 172 is formed at one side of the cap-down 170, and the sub-plate 180 is coupled to the lower part of the cap-down 170. The gas discharge hole 172 allows the internal gas to be discharged through the gas discharge hole 172 when an excessive internal pressure is generated in the case 120. In some embodiments, the protrusion part 151 of the safety vent 150 rises due to the gas that is discharged through the gas discharge hole 172 such that the protrusion part 151 may be separated from the sub-plate 180.

The sub-plate 180 is welded between the first electrode tab 114 and the protrusion part 151 of the safety vent 150, which passes through the opening 171 in the cap-down 170. Accordingly, the sub-plate 180 electrically connects the first electrode tab 114 and the safety vent 150 to each other.

The gasket 190 is installed in the top opening of the case 120. That is to say, the gasket 190 is tightly adhered to regions between the outer peripheral edges of the cap-up 140 and the safety vent 150 and the top opening of the case 120. The gasket 190 may be formed to cover the welding regions 155 between the safety vent 150 and the cap-up 140. The gasket 190 may be made of a resin material, such as polyethylene (PE), polypropylene (PP), or polyethylene terephthalate (PET). The gasket 190 may prevent the cap assembly 130 from being separated from the case 120.

Figure 4A:
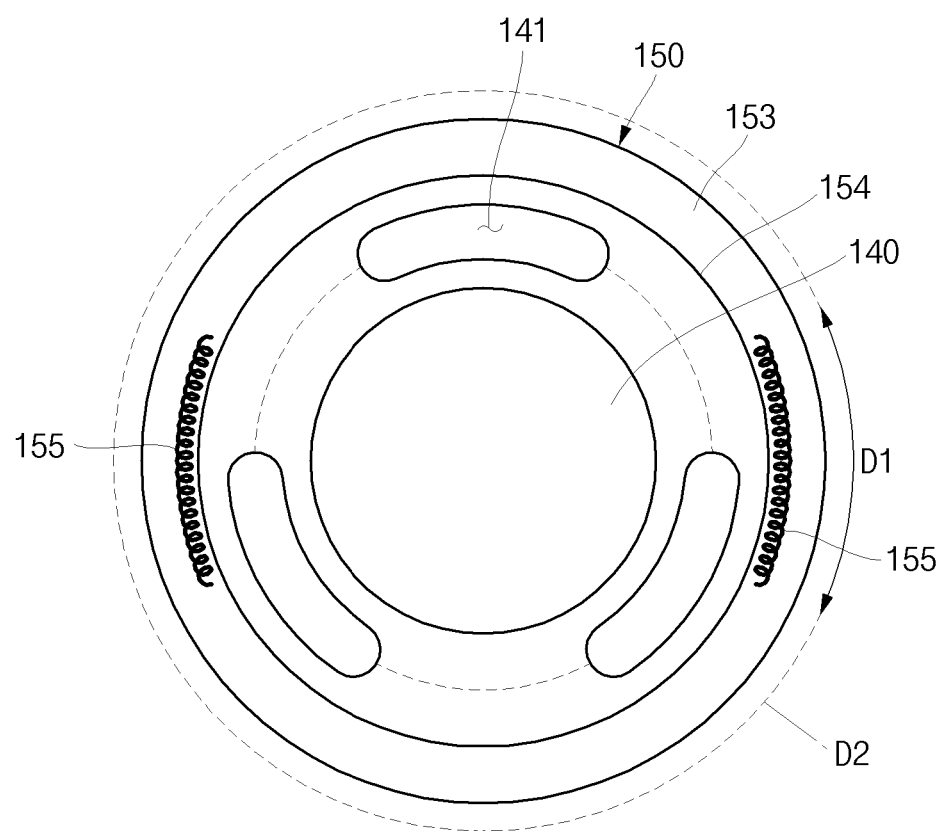
FIGS. 4A and 4B are plan views illustrating welding regions in the secondary battery according to an embodiment of the present invention.
Figure 4B:
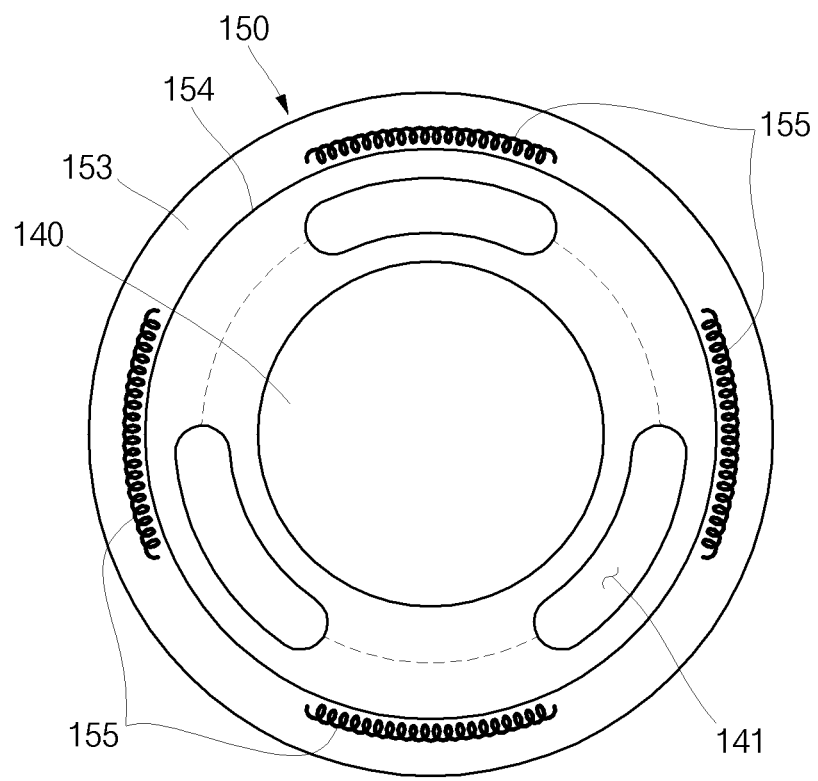
Figure 5:
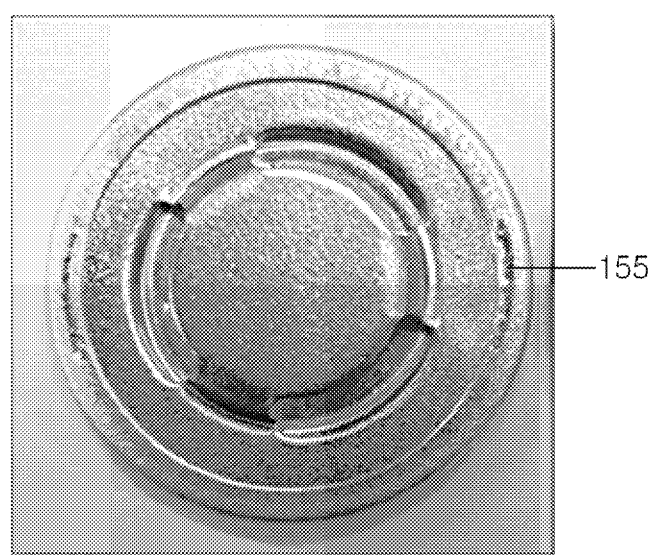
FIG. 5 is a photo showing a welding region formed between a cap-up and a safety vent in the secondary battery according to an embodiment of the present invention.
Figure 6:
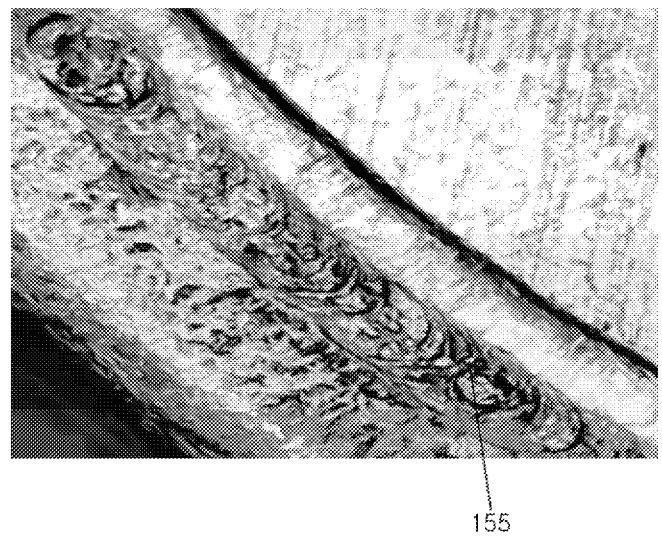
FIG. 6 is an enlarged photo of the welding region shown in FIG. 5.

FIGS. 4A and 4B are plan views illustrating welding regions in the secondary battery according to an embodiment of the present invention. FIG. 5 is a photo showing a welding region formed between a cap-up and a safety vent in the secondary battery according to an embodiment of the present invention. FIG. 6 is an enlarged photo of the welding region shown in FIG. 5.

As illustrated in FIG. 3, the welding region 155 is formed such that the vent extension part 153 and the first metal layer 140a and the second metal layer 142b of the cap-up 140 are fused together and then cured. A top surface of the welding region 155 is concavely formed by laser beam applied during laser welding. In addition, the welding region 155 is formed at a portion spaced a predetermined distance apart from an end 154 of the vent extension part 153 and the top portion of the welding region 155 is covered by the gasket 190. Therefore, the first metal layer 140a of the cap-up 140 is not exposed to the outside, thereby preventing the first metal layer 140a from being oxidized. That is to say, the welding region 155 is outwardly spaced a predetermined distance apart from the end 154 of the vent extension part 153. Here, a distance L1 between the welding region 155 and the end 154 of the vent extension part 153 is greater than 1% of a length L2 of the vent extension part 153. For example, the distance L1 may be formed to be at least 0.03 mm or greater. If the distance L1 is smaller than 1% of the length L2 of the vent extension part 153, the welding region 155 extends over the end 154 of the vent extension part 153, so that the first metal layer 140a of the cap-up 140 may be exposed to the outside.

When conventionally welding a safety vent and a cap-up to each other, spot welding has been performed on an end of the safety vent, that is, a boundary surface of the safety vent to be welded to the cap-up, thereby fixing the safety vent to the cap-up. In this case, however, a second metal layer of the cap-up may be stripped off, and a first metal layer may be exposed to the outside, resulting in rust generation on the exposed first metal layer. By contrast, according to the present invention, the welding region 155 between the safety vent 150 and the cap-up 140 is formed to be spaced a predetermined distance apart from the end 154 of the safety vent 150, so that the welding region 155 is covered by the gasket 190, thereby preventing the first metal layer 140a from being oxidized by preventing the first metal layer 140a of the cap-up 140 from being exposed to the outside.

In addition, as illustrated in FIGS. 4A and 4B, laser welding between the safety vent 150 and the cap-up 140 is performed in a line shape. Additionally, the welding region 155 may be provided at two points (see FIG. 4A) or at four points (see FIG. 4B). In addition, as illustrated in FIGS. 5 and 6, the line-shape welding regions 155 may be formed by slowly moving a laser beam sideways while rotating the laser beam in one direction. If the secondary battery 100 has a relatively small diameter or if a length of the welding region 155 is increased, the welding region 155 may be formed in an arch or arc shape.

Unlike in the conventional welding between the safety vent and the cap-up, in which spot welding is performed in a point shape, in the present invention, the welding region 155 is formed in a line shape, thereby improving coupling strength between the safety vent 150 and the cap-up 140. A length D1 of the welding region 155 is greater than 5% of the overall circumference D2 of the vent extension part 153. If the length D1 of the welding region 155 is smaller than 5% of the overall circumference D2 of the vent extension part 153, the welding performed in the line shape is almost like the spot welding, and thus improvement in the coupling strength between the safety vent 150 and the cap-up 140 is insufficient.

As such, the secondary battery 100 according to an embodiment of the present invention may have an improved coupling force between the safety vent 150 and the cap-up 140 by coupling the safety vent 150 and the cap-up 140 by laser welding in a line shape.

In addition, in the secondary battery 100 according to an embodiment of the present invention, the welding region 155 between the safety vent 150 and the cap-up 140 is spaced a predetermined distance apart from the end 154 of the safety vent 150 so as to cover the welding region 155 using the gasket 190, thereby improving quality by preventing the cap-up 140 from being oxidized.

Figure 7:
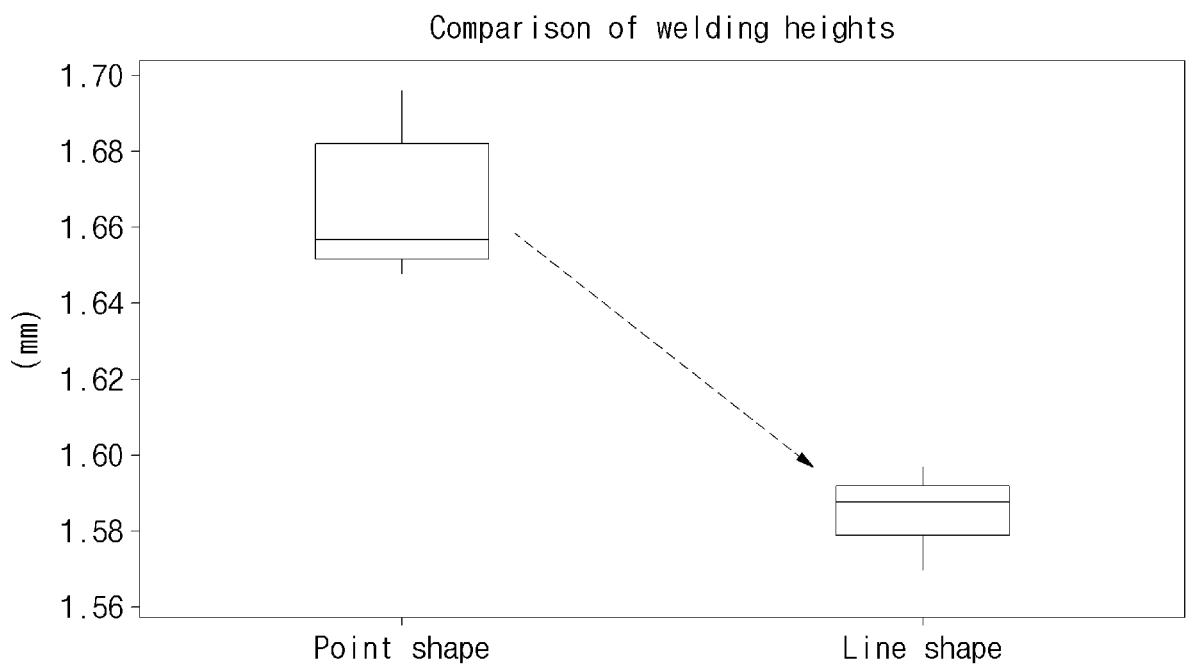
FIG. 7 is a graphical representation for comparing welding heights of a point-shape welding region and a line-shape welding region.

FIG. 7 is a graphical representation for comparing welding heights of a point-shape welding region and a line-shape welding region.

Referring to FIG. 7, a point-shape welding region has a height in a range of about 1.66 mm to about 1.68 mm, while a line-shape welding region has a height of about 1.58 mm. That is to say, the conventional point-shape welding may provide a reduced sealing force between the gasket and the case due to the protruding welding region. In the present invention, however, the welding region between the safety vent and the cap-up is welded in a line shape, and thus the welding height is reduced, as illustrated in FIG. 7, thereby improving the coupling force between the gasket and the case.

Figure 8:
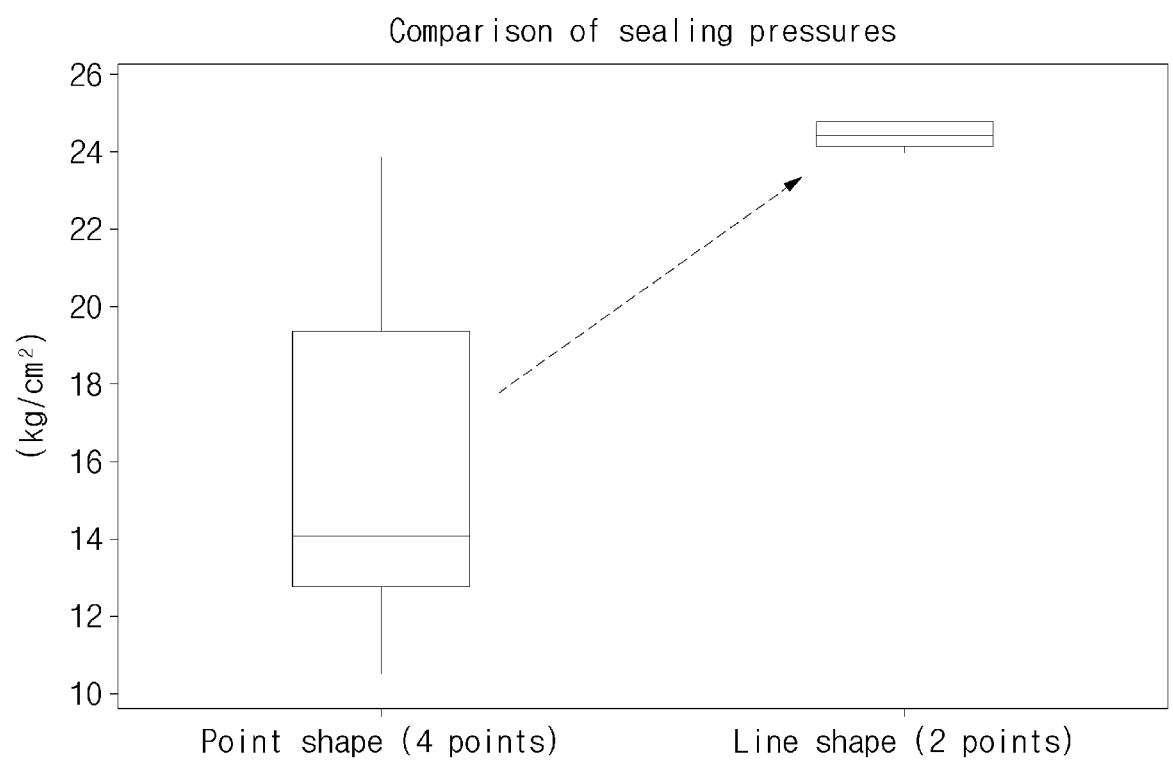
FIG. 8 is a graphical representation for comparing sealing capacities of a point-shape welding region and a line-shape welding region.

FIG. 8 is a graphical representation for comparing sealing capacities of a point-shape welding region and a line-shape welding region.

Referring to FIG. 8, when the safety vent and the cap-up are welded to each other at four points in a point shape, a sealing pressure applied between the safety vent and the cap-up is in a range of about 13 kg/cm$^2$ to about 19 kg/cm$^2$. When the safety vent and the cap-up are welded to each other at two points in a line shape, a sealing pressure applied between the safety vent and the cap-up is about 24 kg/cm$^2$. This suggests that the sealing force between the safety vent and the cap-up is improved by welding the safety vent and the cap-up to each other in a line shape, like in the present invention.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
   an electrode assembly;
   a case for accommodating the electrode assembly;
   a cap assembly coupled to an upper part of the case; and
   a gasket between the cap assembly and the case,
   wherein the cap assembly comprises:
      a cap-up,
      a safety vent at a lower part of the cap-up and comprising a vent extension part extending to an upper part of the cap-up so as to encompass an edge of the cap-up, and
      a welding region at which the safety vent and the cap-up are welded and coupled by laser welding, the welding region being in the vent extension part, and having a line shape extending along a circumferential end of the vent extension part, and
   wherein the welding region is spaced apart from the circumferential end of the vent extension part.

2. The secondary battery of claim 1, wherein a distance between the welding region and the circumferential end of the vent extension part is greater than 1% of a length of the vent extension part.

3. The secondary battery of claim 1, wherein the welding region is covered by the gasket.

4. The secondary battery of claim 1, wherein a length of the welding region is greater than 5% of an overall circumference of the vent extension part.

5. The secondary battery of claim 1, wherein the welding region is formed by moving a laser beam sideways while rotating the laser beam in one direction.

6. The secondary battery of claim 1, wherein an upper part of the welding region is concave relative to an upper surface of the vent extension part.

7. The secondary battery of claim 1, wherein the welding region comprises two or more welding regions.

8. The secondary battery of claim 1, wherein the cap-up comprises a first metal layer made of iron and a second metal layer comprising nickel plated on a surface of the first metal layer, and the welding region comprises the vent extension part, the first metal layer and the second metal layer fused together and cured.

9. The secondary battery of claim 1, wherein the case comprises:
   a lower plate;
   a side plate extending upward from an edge of the lower plate; and
   a crimping part at an uppermost end of the side plate and bent toward the cap assembly to fix the safety vent.

10. The secondary battery of claim 9,
    wherein an end of the crimping part does not overlap the welded region of the safety vent in a radial direction of the case.

11. The secondary battery of claim 9,
    wherein an end of the crimping part is located outside the welded region of the safety vent in a radial direction of the case.

* * * * *